March 26, 1935. V. C. NORQUIST 1,996,000
FILTER
Filed Feb. 3, 1934
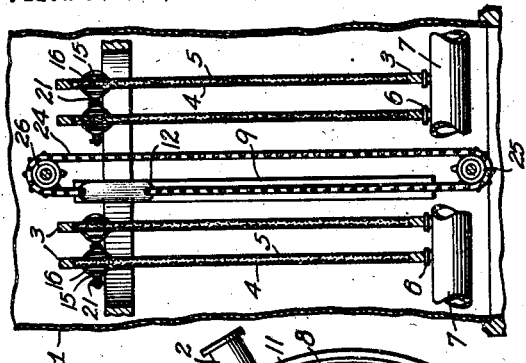
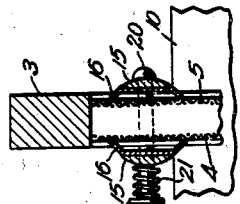
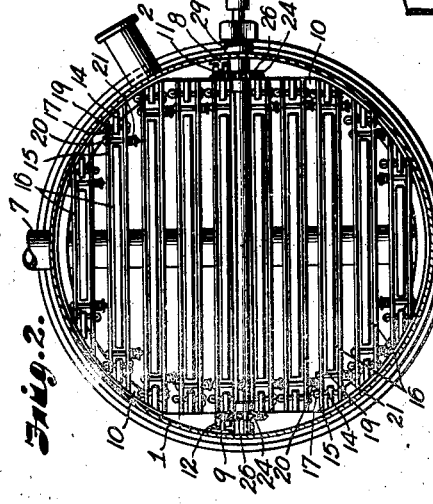
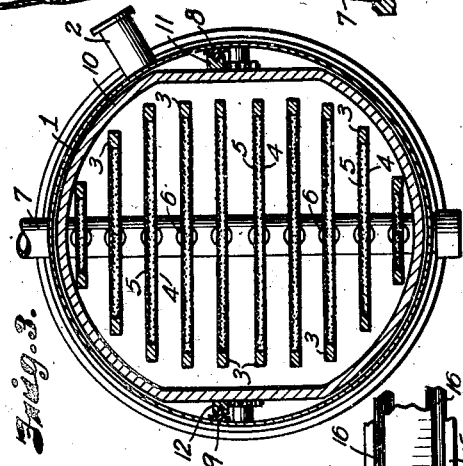
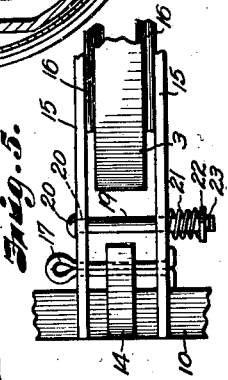
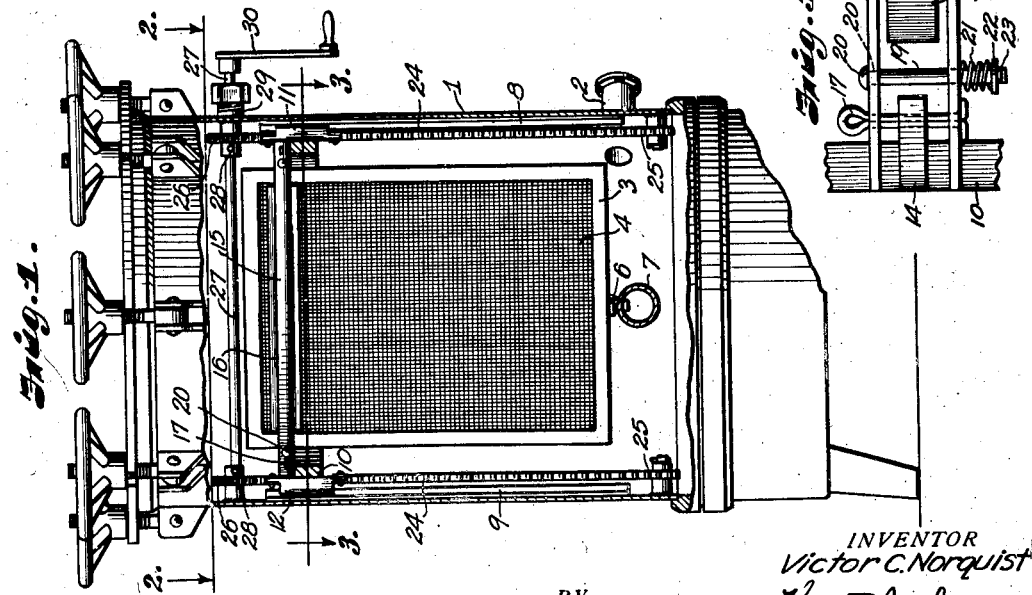
INVENTOR
Victor C. Norquist
BY
ATTORNEY Patented Mar. 26, 1935

1,996,000

UNITED STATES PATENT OFFICE 1,996,000

FILTER

Victor C. Norquist, Kansas City, Mo., assignor to Butler Manufacturing Company, Kansas City, Mo., a corporation of Missouri Application February 3, 1934, Serial No. 709,601

3 Claims. (Cl. 210—182)

My invention relates to filters and more particularly to a filter having incorporated therewith means for cleaning the filtering surfaces of the filtering elements thereof.

In filters of the type which comprise a casing in which hollow filter members are placed in which the liquid flows into the casing through the filtering mediums into the interior thereof, and out of the filter, the filtering surfaces become clogged and covered with matter filtered out. This necessitates a cleaning and is, in the case of multi-filtering element filters, a difficult and time-consuming task.

One object of my invention is to provide a simple and expeditious means for cleaning the filtering surfaces of filters of the character described.

Another object of my invention is to provide a cleaning means incorporated in a filter, which will not change the operation of the filter, and which will eliminate the necessity of opening the same for cleaning of the filtering surfaces.

Further and other objects of my invention will appear from the following description.

In the accompanying drawing which forms part of the instant invention and is to be read in conjunction therewith, and in which like reference numerals are used to indicate like parts in the various views:

Figure 1 is a side elevation partly in section of a filter embodying one mode of carrying out my invention.

Figure 2 is a sectional view taken on a line 2—2 of Figure 1.

Figure 3 is a sectional view taken on a line 3—3 of Figure 1.

Figure 4 is a fragmentary sectional view showing details of construction.

Figure 5 is a fragmentary view showing a detail of the method of securing the scraper members to the mounting means.

Figure 6 is a detail sectional view on a large scale showing a section through the filtering screen and a scraper member.

In general, my invention contemplates the provision of a mounting means carrying a plurality of scraper members contacting the filter screen surfaces. The mounting means is arranged to be reciprocated, carrying the scrapers over the screen surfaces in both directions of movement.

More particularly referring now to the drawing, a filter casing 1 into which the liquid to be filtered enters through inlet 2, houses a plurality of hollow filter leaves 3 formed by screen surfaces 4 and 5. The interior of the filter leaves 3 communicates through nipples 6 with a manifold 7 through which the filtrate is withdrawn. Within the filter, I provide a pair of guide members 8 and 9. A frame member 10, substantially conforming with the interior periphery of the filter, carries guide members 11 and 12, adapted to coact with and ride on the guide rails 8 and 9. The frame 10 carries a plurality of lugs 14 symmetrically spaced on opposite sides thereof as can readily be seen by reference to Figure 2.

Bars 15 have secured thereto transversely extending blades 16, which may be made out of resilient material of any suitable character and secured to the bars in any suitable manner as for example by brazing, nuts, bolts, or the like. The bars 15 are supported in pairs on opposite sides of a pair of lugs 14, by means of cotter pins 17. It is to be understood, of course, that any suitable means may be used for attaching the bars 15 to the lugs. The bars are provided with a pair of holes 18 through which pins 19 are positioned. One end of pin 19 is formed with a head 20 adapted to bear against the surface of one of the bars. A spring 21 is adapted to urge the bars together. The spring is secured in place by means of a washer 22 and cotter pin 23. It is to be understood, of course, that any suitable similar construction may be used. The result of the assembly is that the scraper blades 16 are pressed against the screen surfaces 4 and 5 due to the action of the springs 21. It will be readily understood that this tension may be varied at will by the use of springs of various degrees of resiliency and length or by means of adjusting the pressure of a spring by a plurality of cotter pin holes or by using a nut as the security means for the washer 22. This will be obvious from the nature of the construction. The guide members 11 and 12, which are secured to the frame 10, are provided with means for securing flexible actuary means such as a sprocket chain 24 thereto, as can readily be appreciated by reference to Figure 4. The sprocket chain passes over sprocket wheels 25 and 26. Sprocket wheels 26 are secured to shaft 27 by means of pins 28 or in any other suitable manner. The shaft 27 extends through the casing wall 1 and is provided with a stuffing box 29. The protruding end of the shaft 27 carries an operating handle 30.

In operation, after the filter has been in use for some time and it is desired to clean the filtering surfaces thereof, the handle 30 is rotated. This rotates the shaft 27, and sprocket wheels 26, and drives the sprocket chains 24 which, it was pointed out above, are secured to the ends of guide members 11 and 12. This moves the frame 14 downwardly, carrying the bars 15 and the scraper blades 16 over the surfaces 4 and 5 of the respective filter leaves 3, scraping the sediment, filter aid, and the like, from the surfaces of the screens. At the bottom of the reciprocating motion, that is, when guide members 11 and 12 contact sprocket wheels 25, the scraper blades will have reached the lower limit of the screen surfaces 4 and 5. The handle 30 is then rotated in the opposite direction until the guide members 11 and 12 contact the sprocket wheels 26, at which position the upper limit of movement is reached. During the reciprocating movement, the scraper blades will have traversed up and down both screen surfaces of each of the respective filter leaves simultaneously. The area of the scraper blades is small, so that very little filtering area is lost by the baffling action thereof. It will be noted that the scraper blades 16 have only their edges touching the filtering screens and are spaced therefrom intermediate the edges so that the filtering area is not obscured. It will be understood that suitable stops may be provided in the guideways 8 and 9 to define the limits of movement of the frame.

It will be seen that I have accomplished the objects of my invention. I have provided a simple and expedient cleaning means incorporated in a filter for cleaning the filtering surfaces without the necessity of removing the filtering screens or opening the filter. The sediment scraped from the filtering leaves precipitates to the lower portion of the filter and may be removed in a number of different manners.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a filter having a filter casing, a plurality of filter members positioned within said casing in spaced relation to each other, means for supplying liquid to be filtered into said casing and means for withdrawing filtrate from said filter members; an annular frame surrounding said filter members, a plurality of pairs of scraper members loosely and removably carried by said frame and disposed to contact opposite surfaces of respective filter members, resilient means for urging said scraper members toward each other into contact with the filter member surfaces and means for reciprocating said frame.

2. In a filter having a filter casing, a plurality of filter members positioned within said casing in spaced relation to each other, means for supplying liquid to be filtered into said casing and means for withdrawing filtrate from said filter members; an annular frame surrounding said filter members, a plurality of lugs carried by said frame, a plurality of pairs of scraper members movably carried by said lugs and disposed to contact opposite surfaces of respective filter members, and resilient means for urging said scraper members into contact with the filter member surfaces, and means for reciprocating said frame.

3. In a filter having a filter casing, a plurality of filter members positioned within said casing in spaced relation to each other, means for supplying liquid to be filtered into said casing and means for withdrawing filtrate from said filter members; an annular frame surrounding said filter members, a plurality of lugs carried by said frame, a plurality of pairs of scraper members movably carried by said lugs and disposed to contact opposite surfaces of respective filter members, resilient means for urging said scraper members into contact with the filter member surfaces, a shaft extending into said casing, a pair of pinions keyed to said shaft, a pair of chains disposed within said casing for actuation by said pinions, means for securing said chains to said frame, and means for rotating said shaft from without said casing, whereby to reciprocate said frame.

VICTOR C. NORQUIST.